(12) United States Patent
Lim

(10) Patent No.: US 8,199,652 B2
(45) Date of Patent: Jun. 12, 2012

(54) IP ADDRESS LOOKUP METHOD AND APPARATUS BY USING BLOOM FILTER AND MULTI-HASHING ARCHITECTURE

(75) Inventor: Hyesook Lim, Seoul (KR)

(73) Assignee: Ewha University-Industry Collaboration Foundation, Seoul (KR)

( * ) Notice: Subject to any disclaimer, the term of this patent is extended or adjusted under 35 U.S.C. 154(b) by 617 days.

(21) Appl. No.: 12/428,209

(22) Filed: Apr. 22, 2009

(65) Prior Publication Data

US 2010/0023727 A1 Jan. 28, 2010

(30) Foreign Application Priority Data

Jul. 24, 2008 (KR) .................. 10-2008-0072009

(51) Int. Cl.
*G01R 31/08* (2006.01)

(52) U.S. Cl. .............. 370/235; 370/389; 370/395.1; 709/226; 709/245

(58) Field of Classification Search .......... 709/225–226, 709/237–238, 245–246; 707/607; 370/235–236, 370/394–399
See application file for complete search history.

(56) References Cited

U.S. PATENT DOCUMENTS

| | | | | |
|---|---|---|---|---|
| 7,019,674 B2* | 3/2006 | Cadambi et al. | ............... | 341/106 |
| 7,031,320 B2* | 4/2006 | Choe | ................ | 370/395.31 |
| 7,054,867 B2* | 5/2006 | Bosley et al. | ............ | 1/1 |
| 7,089,240 B2* | 8/2006 | Basso et al. | ............ | 1/1 |
| 7,304,994 B2* | 12/2007 | Dubnicki et al. | ............. | 370/392 |
| 7,602,785 B2* | 10/2009 | Dharmapurikar et al. | ..... | 370/392 |
| 2004/0255045 A1* | 12/2004 | Lim et al. | ............. | 709/245 |
| 2005/0083937 A1* | 4/2005 | Lim | ............. | 370/392 |

OTHER PUBLICATIONS

Zhang et al, a cascade hash design of bloom filter for signature detection, 2009, IFITA, 559-562.*
Marcel, scalable high speed IP routing lookups, 1997, computer engineering and networks laboratory, 25-36.*
Heeyol et al, a space and time efficient hash table hierarchically indexed by bloom filters, 2008, IEEE, 12 pages.*
Sarang et al, longest prefix matching using bloom filters, Aug. 2003, ACM, 12 pages.*
Lunteren et al, searching very large routing tables in wide enbedded memory, Nov. 2001, IEEE, 6 pages.*
Song et al, fast hash table lookup using extended bloom filter: an aid to network processing, Aug. 2005, ACM, 12 pages.*

* cited by examiner

*Primary Examiner* — Ayaz Sheikh
*Assistant Examiner* — Mounir Moutaouakil

(57) ABSTRACT

The present invention relates to an apparatus and method of looking up an IP address using a Bloom filter and a multi-hashing architecture. The present invention generates a plurality of hashing indexes by hashing inputted prefixes, determines whether a bit vector corresponding to the plurality of hashing indexes is positive or negative by using the Bloom filter, and outputs a prefix matching the inputted prefix by searching entries of locations indicated by the plurality of hashing indexes in the hash table when the bit vector is determined to be positive. The present invention further outputs the prefix that matches the inputted prefix by searching entries stored in the overflow table.

17 Claims, 9 Drawing Sheets

[Fig. 1] [Prior Art]
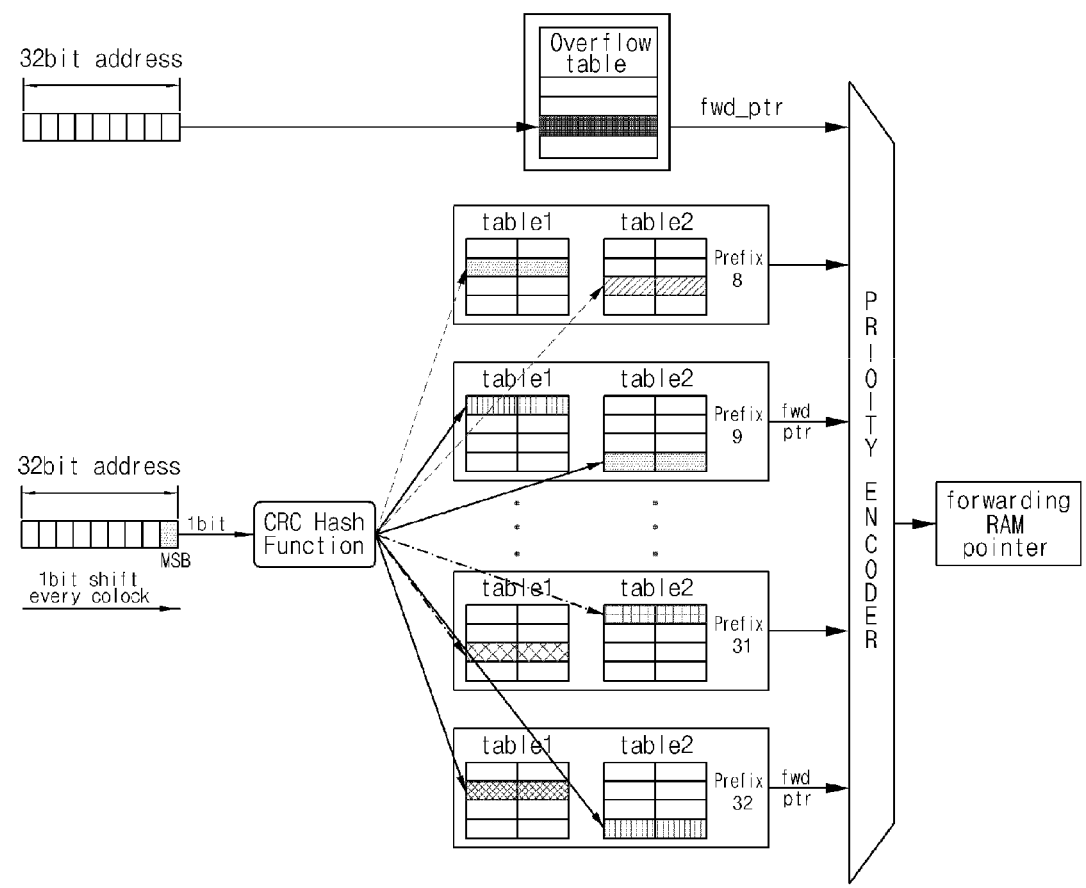

[Fig. 2] [Prior Art]
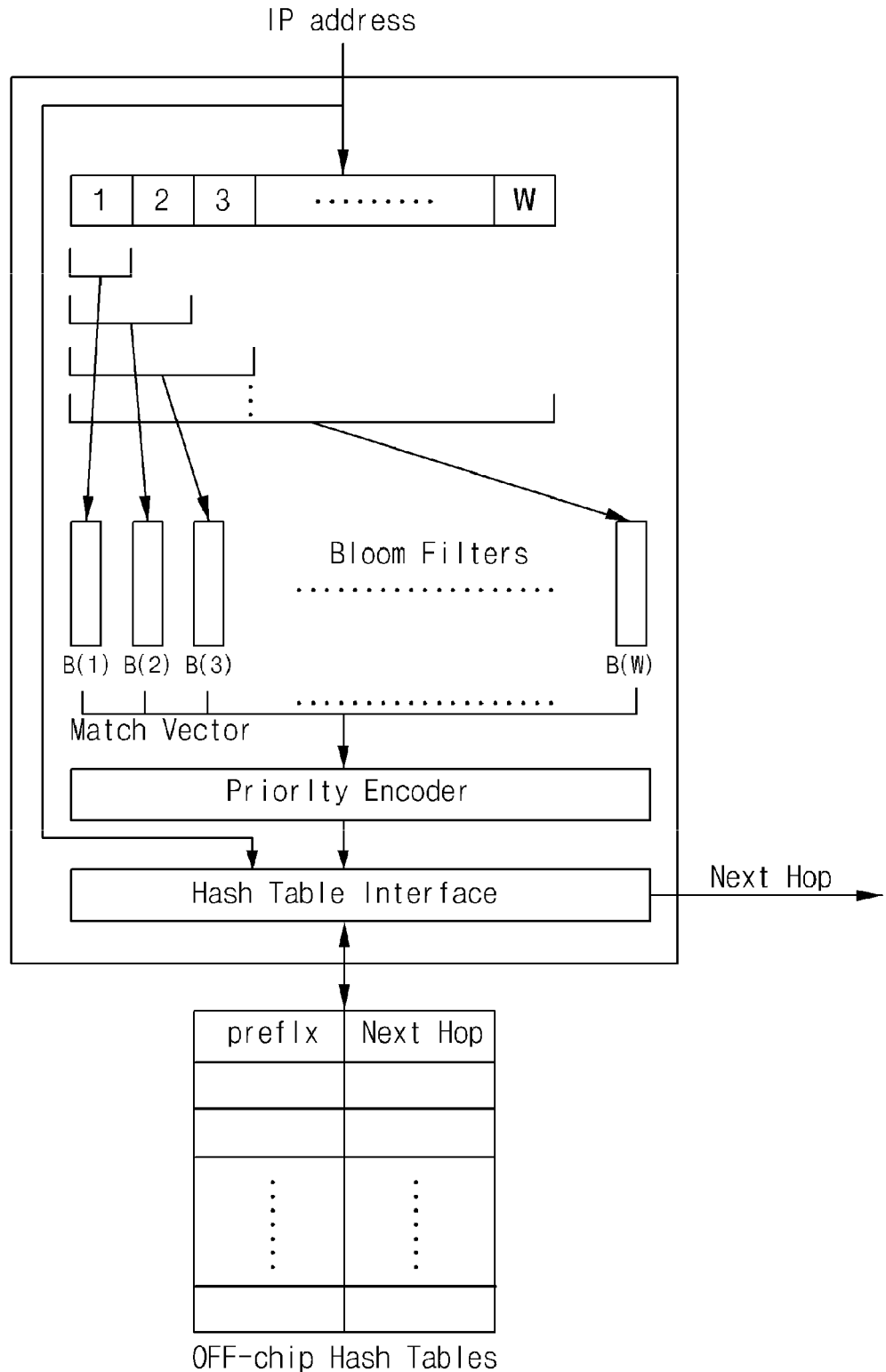

[FIG. 3]
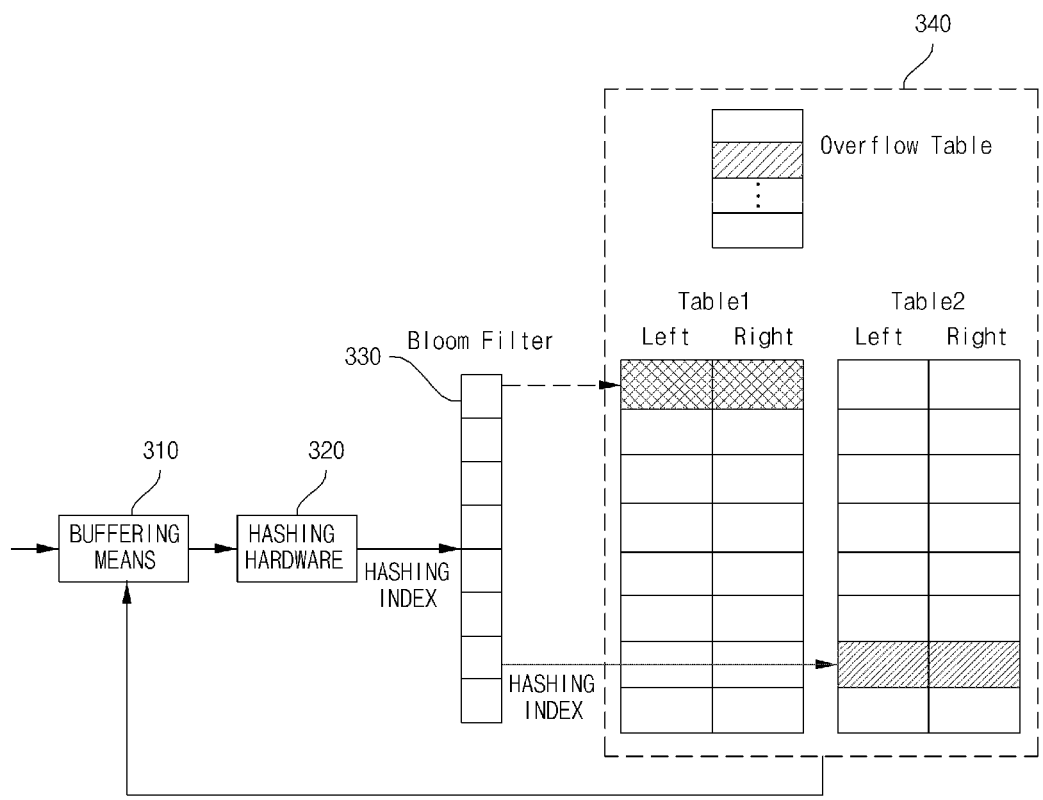

[FIG. 4]
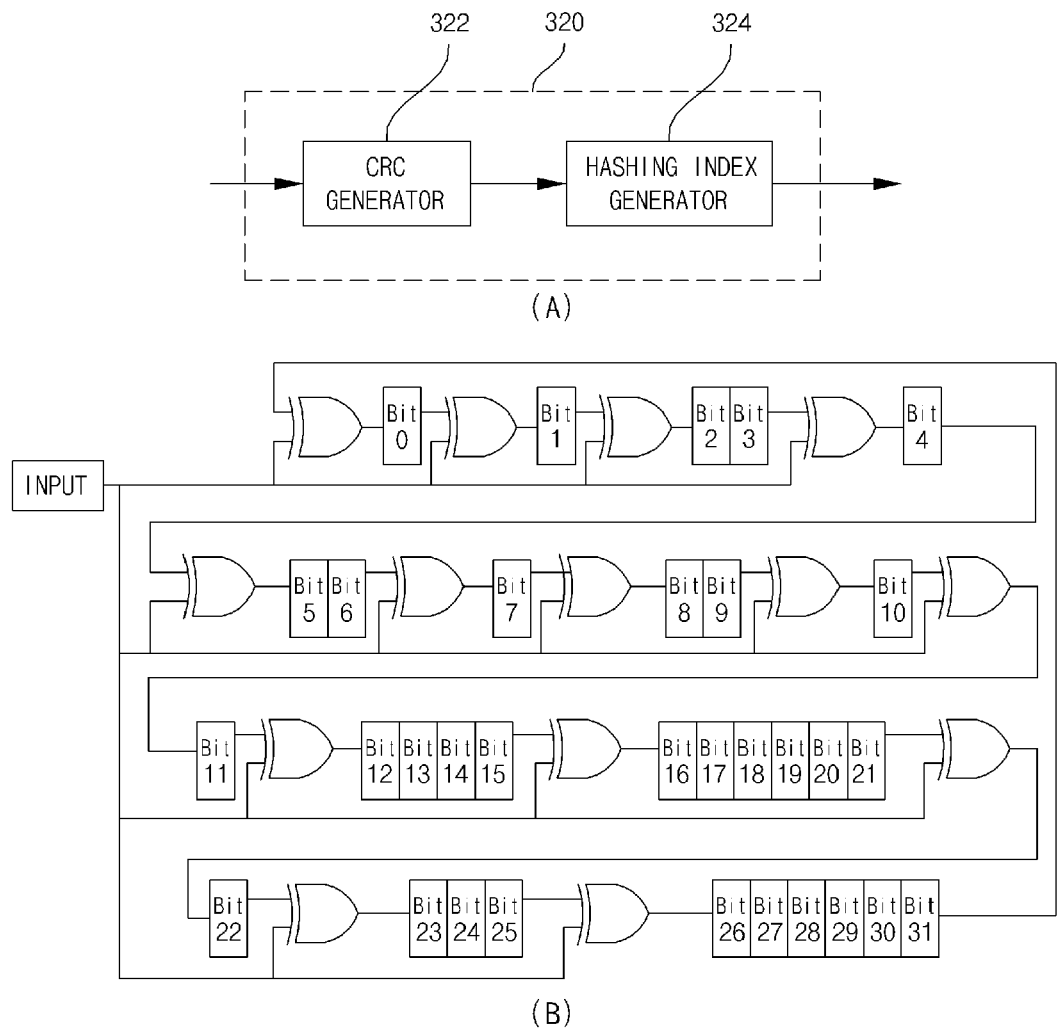

[FIG. 5]
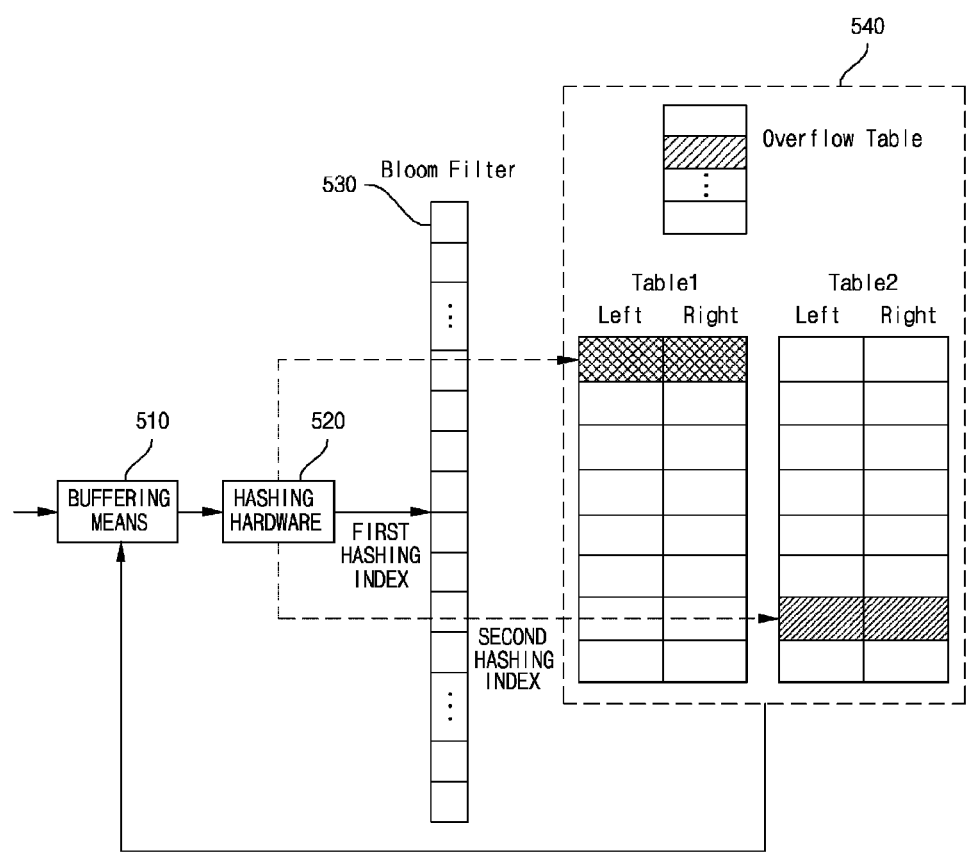

[FIG. 6]
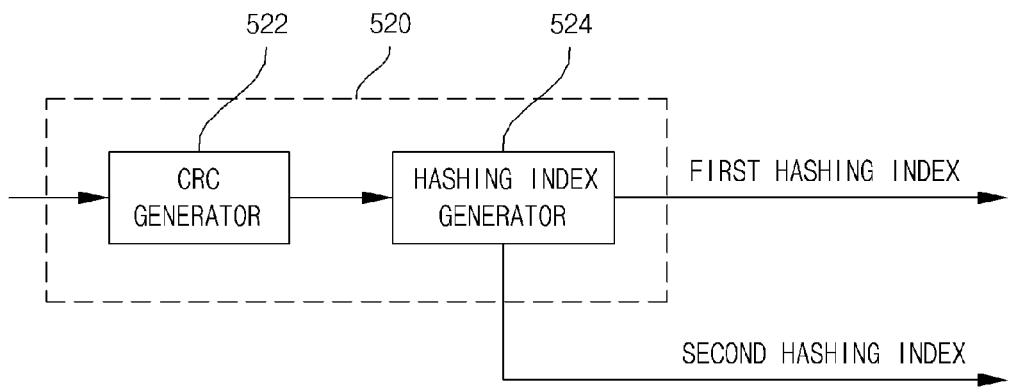
[FIG. 7]
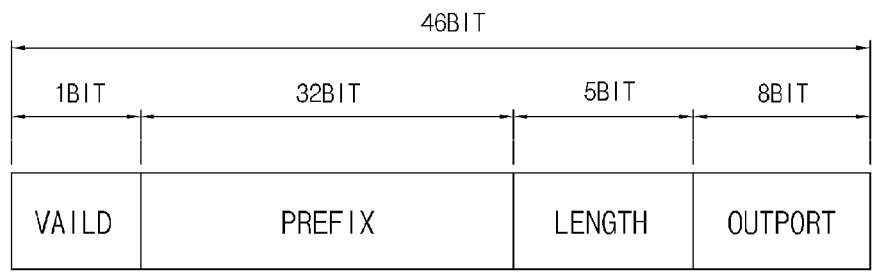

[FIG. 8]
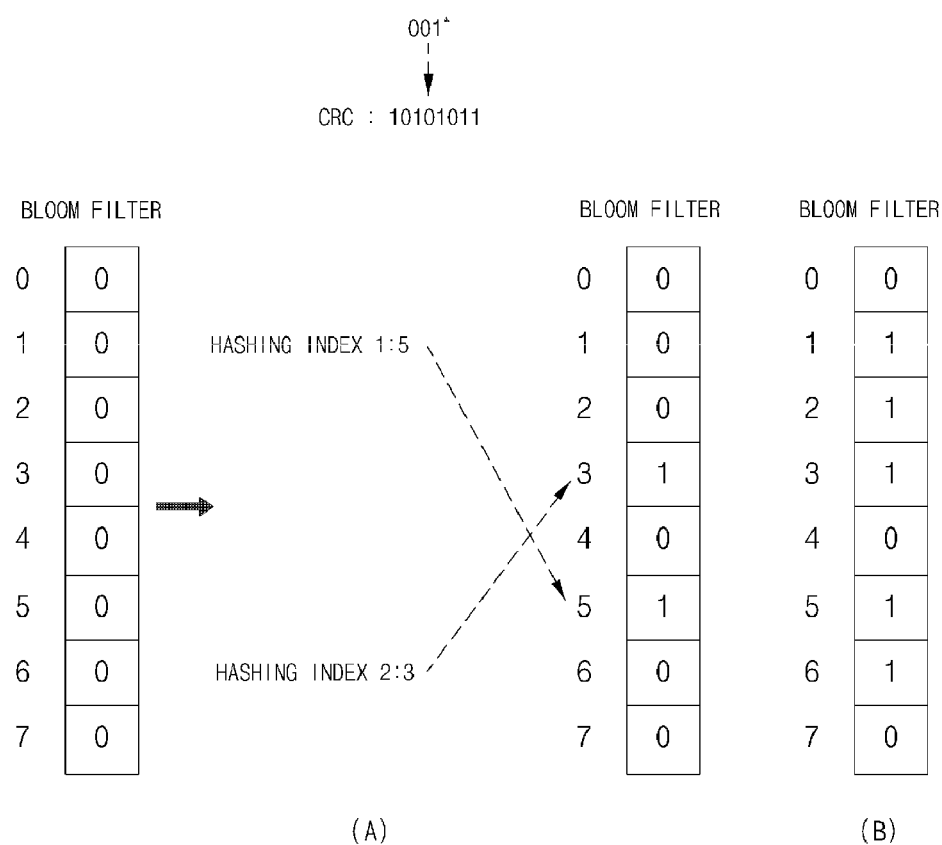

[FIG. 9]
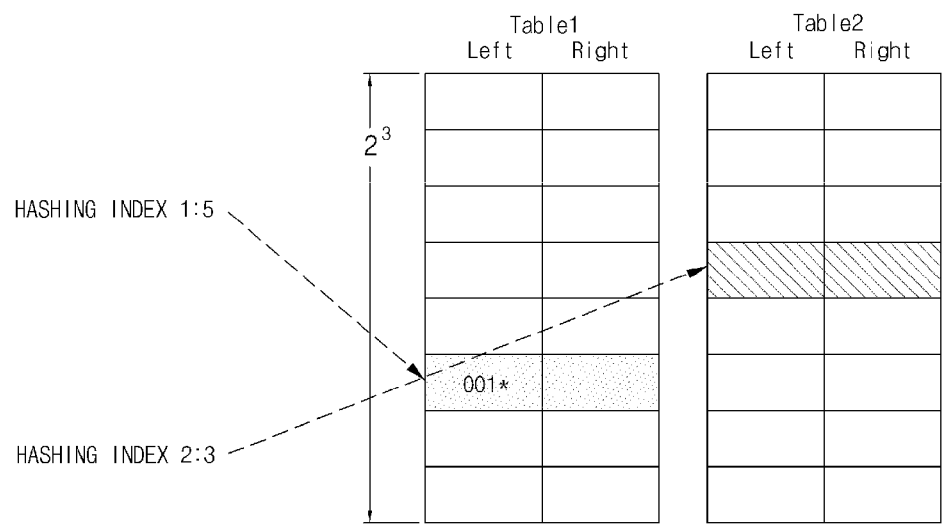
[FIG. 10]
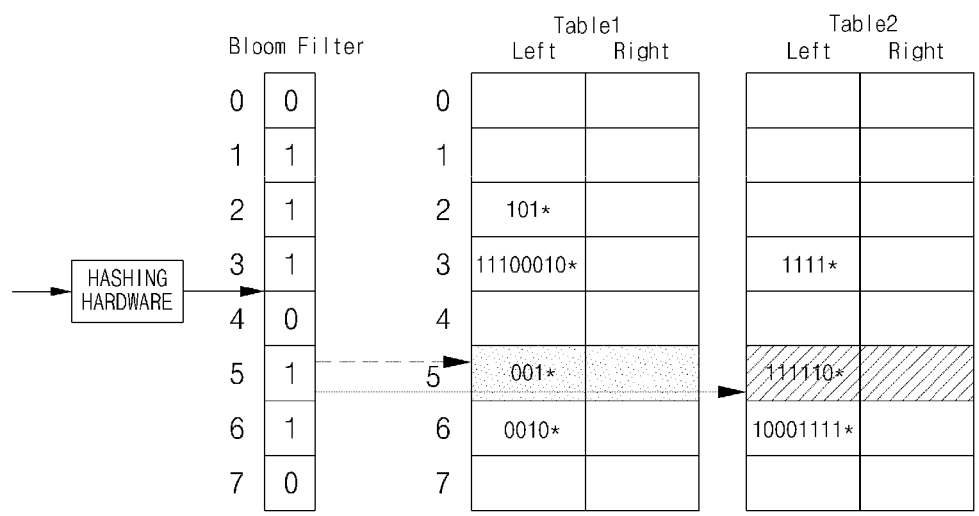

[FIG. 11]
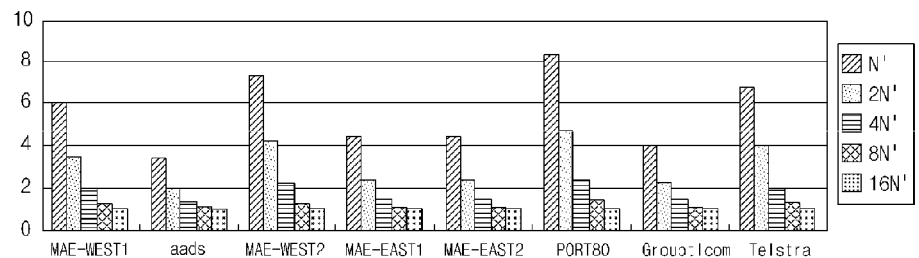
[FIG. 12]
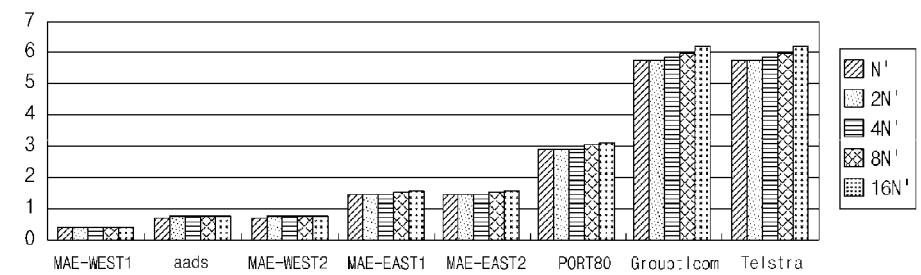
[FIG. 13]
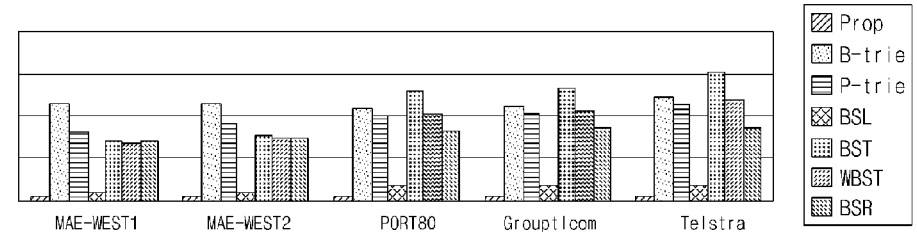
[FIG. 14]
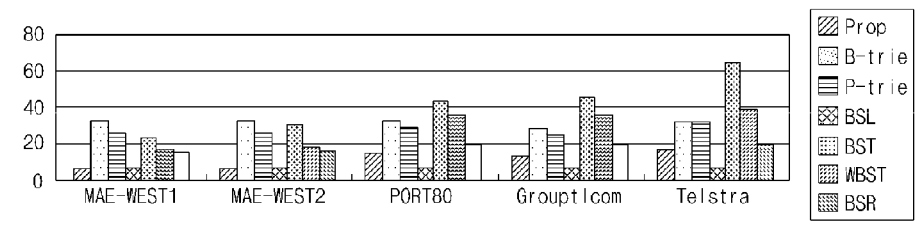

IP ADDRESS LOOKUP METHOD AND APPARATUS BY USING BLOOM FILTER AND MULTI-HASHING ARCHITECTURE

BACKGROUND OF THE INVENTION

1. Technical Field

The present invention relates to an IP address lookup method and an IP address lookup apparatus using a Bloom filter and a multi-hashing architecture. More particularly, the present invention relates to an IP address lookup method and an IP address lookup apparatus that perform IP address lookup by using a single Bloom filter and a single multi-hash table without implementing a Bloom filter and a hash table for each prefix length.

2. Related Art

Currently, more efficient IP address lookup is required to forward a packet inputted into a router with a line speed. The function of the IP address lookup is to determine an output port of the packet by searching an entry that matches the prefix, which is a network part of a destination address of the inputted packet. Among the matching entries of a table, which are stored in the router, the longest matching prefix becomes the best matching prefix (BMP).

In the IP address lookup, the most important element is the number of times in which a memory is accessed, which is required to determine the BMP. A second important element is a size of the memory for storing a routing table. Further, how easy it is to update a table, which can easily add or remove the prefix, is also an important element and in addition, extensibility to IPv6 from IPv4 is also required.

A known IP address lookup architecture includes an algorithm based on a tree architecture such as binary trie (B-Trie), binary search tree (BST), binary search on range (BSR), etc., an algorithm based on a hashing architecture such as parallel hashing, multiple hashing, parallel-multiple hashing in which the parallel hashing and the multiple hashing are mixed, etc., and an algorithm based on the Bloom filter, etc.

FIG. 1 is a diagram illustrating an IP address lookup architecture using a known parallel hashing architecture.

This architecture uses a cyclic redundancy check generator as a hashing function. First, a plurality of hashing indexes are extracted by inputting prefixes into the CRC generator (two hashing indexes are extracted in FIG. 1) and the prefixes are stored using a multi-hashing method. If the prefixes cannot be stored in a given bucket due to collision, the prefixes are stored in an overflow table.

The prefixes are stored in the hash table for each length thereof. Thereafter, when a predetermined IP address is inputted, the prefixes of the IP address are sequentially inputted into the CRC generator from most significant bit (MSB), such that two hashing indexes are generated for each prefix length. That is, when 8 bits are first inputted, two hashing indexes are generated therefrom and when 1 bit is additionally inputted, two hashing indexes corresponding to 9 bits are generated. According to this sequence, two hashing indexes are generated for each prefix length from 8 bits to 32 bits.

Since the parallel-multiple hashing architecture performs the IP address lookup for each prefix length, the hash table is also implemented in a separate SRAM for each prefix length. Therefore, a matched prefix is searched by accessing each hash table in parallel using the hashing indexes generated for each prefix length. The search result is outputted to a priority encoder. The priority encoder outputs a result of the longest prefix that matches the inputted address among outputted results as the BMP.

Since the parallel hashing architecture performs the IP address lookup in parallel for each prefix length, the parallel hashing architecture has an advantage in that the search speed is fast. However, since the parallel hashing architecture must configure the hash table for each prefix length, the hashing architecture is complex to implement and an additional memory is required for each prefix length, resulting in that the parallel hashing architecture consumes excessive amounts of memories.

FIG. 2 is a diagram illustrating an IP address lookup architecture using a known Bloom filter.

This architecture includes a Bloom filter for each prefix length to query the inputted prefixes to the Bloom filter in parallel for each length and it is checked whether a matched prefix is provided in the hash table by accessing the hash table from the longest prefix for only a length determined to belong to the hash table by the Bloom filter.

Since the architecture using the Bloom filter tries to access the hash table only with respect to a length passing the Bloom filter, the architecture has an advantage of reducing the number of times in which the memory is accessed.

However, since the IP address lookup architecture using the Bloom filter also searches the IP address for each prefix length, the IP address lookup architecture must configure the Bloom filter for each prefix length, such that the IP address lookup architecture is difficult to implement. Further, this architecture assumes that the hash table is configured for each prefix length and proposes that a controlled prefix expansion (CPE) scheme is used in order to reduce the number of hash tables. In the case of using the CPE scheme, prefix replication is inevitable.

As described above, since the known IP address lookup architecture configures the hash table for each prefix length and/or includes the Bloom filter for each prefix length in order to increase the search speed, the IP address lookup architecture is difficult to implement and the number of memories increase, thereby increasing manufacturing cost.

The present invention is contrived to solve the above-mentioned problems. An object of the present invention is to provide an IP address lookup apparatus and an IP address lookup method that can search an IP address by using a single Bloom filter and a single multi-hash table without implementing a Bloom filter and a hash table for each prefix length.

According to a first aspect of the present invention, an IP address lookup apparatus using a Bloom filter and a multi-hashing architecture includes a buffering means that outputs a prefix of an inputted address having the number of bits reduced by one bit whenever a control signal is received at the time of outputting the prefix of the inputted address; a hashing hardware that generates a plurality of hashing indexes by hashing the prefix (hereinafter, referred to as "output prefix") outputted from the buffering means; a Bloom filter that determines whether or not the output prefix is an entry of the hash table by using the plurality of hashing indexes; and a processor that includes the hash table and an overflow table and outputs a prefix that matches the output prefix by searching entries of locations of the hash table indicated by the plurality of hashing indexes and entries stored in the overflow table when a Bloom filter's determination result is positive and outputs the control signal to the buffering means when the matched prefix is not provided or the Bloom filter's determination result is negative.

According to a second aspect of the present invention, an IP address lookup apparatus using a Bloom filter and a multi-hashing architecture includes a buffering means that outputs a prefix of an inputted address having the number of bits reduced by one bit whenever a control signal is received at the time of outputting the prefix of the inputted address; a hashing hardware that generates a plurality of first hashing indexes and a plurality of second hashing indexes by hashing the prefix (hereinafter, referred to as "output prefix") outputted from the buffering means; a Bloom filter that determines whether or not the output prefix is an entry of the hash table by using the plurality of first hashing indexes; and a processor that includes the hash table and an overflow table and outputs a prefix that matches the output prefix by searching entries of locations of the hash table indicated by the plurality of second hashing indexes and entries stored in the overflow table when a Bloom filter's determination result is positive and outputs the control signal to the buffering means when the matched prefix is not provided or the Bloom filter's determination result is negative.

According to a third aspect of the present invention, an IP address lookup method using a Bloom filter and a multi-hashing architecture includes (a) generating a plurality of hashing indexes by hashing inputted prefixes; (b) determining whether a bit vector corresponding to the plurality of hashing indexes is positive or negative by using the Bloom filter; (c) outputting a prefix that matches the inputted prefix by searching entries of locations indicated by the plurality of hashing indexes in the hash table when the bit vector is determined to be positive in step (b); (d) outputting the prefix that matches the inputted prefix by searching entries stored in the overflow table; (e) outputting as a result value a matched prefix having the longest length among the prefix outputted in step (c) and the prefix outputted in step (d), which matches the prefix; and (f) reinputting a prefix having the number of bits reduced from the inputted prefix by one bit and returning to step (a) when the bit vector is determined to be negative in step (b) or an entry matching the prefix is not provided in steps (c) and (d).

According to a fourth aspect of the present invention, an IP address lookup method using a Bloom filter and a multi-hashing architecture includes (a) generating a plurality of first hashing indexes and a plurality of second hashing indexes by hashing inputted prefixes; (b) determining whether a bit vector corresponding to the plurality of first hashing indexes is positive or negative by using the Bloom filter; (c) outputting a prefix that matches the inputted prefix by searching entries of locations indicated by the plurality of second hashing indexes in the hash table when the bit vector is determined to be positive in step (b); (d) outputting the prefix that matches the inputted prefix by searching entries stored in the overflow table; (e) outputting as a result value a matched prefix having the longest length among the prefix outputted in step (c) and the prefix outputted in step (d), which matches the prefix; and (f) reinputting a prefix having the number of bits reduced from the inputted prefix by one bit and returning to step (a) when the bit vector is determined to be negative in step (b) or an entry matching the prefix is not provided in steps (c) and (d).

BRIEF DESCRIPTION OF THE DRAWINGS

FIG. 1 is a diagram illustrating an IF address lookup architecture using a known parallel hashing architecture;

FIG. 2 is a diagram illustrating an IP address lookup architecture using a known Bloom filter;

FIG. 3 is a diagram illustrating a configuration of an IP address lookup apparatus according to an embodiment of the present invention;

FIG. 4 is a diagram of an architecture of a hashing hardware according to an embodiment of the present invention;

FIG. 5 is a diagram illustrating a configuration of an IP address lookup apparatus according to another embodiment of the present invention;

FIG. 6 is a diagram of an architecture of a hashing hardware according to another embodiment of the present invention;

FIG. 7 is a diagram of an entry architecture of a hash table used in an embodiment of the present invention;

FIGS. 8A and 8B are diagrams for illustrating a method of programming a Bloom filter according to an embodiment of the present invention;

FIG. 9 is a diagram for illustrating a method of storing a prefix in a hash table according to an embodiment of the present invention;

FIG. 10 is an exemplary diagram for illustrating a process of searching an IP address according to an embodiment of the present invention;

FIG. 11 is a graph illustrating a performance of the present invention depending on a size of a Bloom filter;

FIG. 12 is a graph comparing memory demands of a hash table when a size of a Bloom filter increases;

FIG. 13 is a graph comparing the average number of times in which a memory is accessed of an IP lookup architecture according to the present invention with that of a known IP lookup architecture; and FIG. 14 is a graph comparing the maximum number of times in which a memory is accessed of an IP lookup architecture according to the present invention with that of a known IP lookup architecture.

DESCRIPTION OF THE PREFERRED EMBODIMENTS

Hereinafter, preferred embodiments of the present invention will be described in detail with reference to the accompanying drawings. First of all, we should note that in giving reference numerals to elements of each drawing, like reference numerals refer to like elements even though like elements are shown in different drawings. Further, in describing the present invention, well-known functions or constructions will not be described in detail since they may be apparent to those skilled in the art or unnecessarily obscure the understanding of the present invention.

FIG. 3 is a diagram illustrating a configuration of an IP address lookup apparatus according to an embodiment of the present invention.

As shown in FIG. 3, the IP address lookup apparatus according to the embodiment of the present invention includes a buffering means 310, a hashing hardware 320, a Bloom filter 330, and a processor 340.

The buffering means 310, as a means that outputs a prefix of an input IP address to the hashing hardware 320, outputs a prefix of which the number of bits is reduced by one bit whenever a control signal is received from the processor 340.

The hashing hardware 320 generates a plurality of hashing indexes by hashing the prefix outputted from the buffering means 310. In the embodiment, as shown in FIG. 4A, the hashing hardware 320 is implemented by a cyclic redundancy check (CRC) generator 322 and a hashing index generator 324.

The CRC generator 322 generates all scrambled codes having the same length from prefixes having different lengths. The codes generated from the CRC generator are data having a predetermined length in which bits constituting each prefix are scrambled by a predetermined rule. Therefore, it is possible to obtain the desired number of hashing indexes having a desired length by using the codes generated from the CRC generator. Further, since collision may occur between the prefixes while hashing, it is important to minimize the collision. The CRC generator has an advantage of obtaining a hashing index having low collision while being easily implemented by the hardware.

FIG. 4B illustrate an architecture of a 32-bit CRC generator used in the embodiment. All flip-flops in the CRC generator 322 is initialized to 0. When input values are inputted by one bit, XOR operation is performed with respect to values stored in the flip-flops and inputted bit values. Further, when a last bit is inputted, the values stored in the flip-flops are outputted as CRC codes while the CRC generator stops.

The hashing index generator 324 extracts a plurality of hashing indexes from the codes generated from the CRC generator 322. For example, the hashing index generator 324 generates two hashing indexes by a scheme in which first several bits and last several bits of the code generated from the CRC generator 322 are extracted.

The plurality of hashing indexes generated from the hashing index generator 324 are commonly used as pointers of the Bloom filter and the hash table.

Referring back to FIG. 3, the Bloom filter 330 of the embodiment of the present invention determines whether or not the inputted prefix is the entry of the hash table by using the plurality of hashing indexes outputted from the hashing index generator 324. That is, when values of all bit vectors that correspond to the plurality of hashing indexes are 1 (referred to as "positive"), it is determined that a prefix matching the inputted prefix may be provided in the hash table and when 0 is provided among the values of the bit vectors that correspond to the plurality of hashing indexes (referred to as "negative"), it is determined that the prefix matching the inputted prefix is not provided in the hash table.

The Bloom filter may determine that a predetermined value is provided in a predetermined set although the predetermined value is not provided in the predetermined set (referred to as "false positive"), but the Bloom filter does not determine that the predetermined value is not provided in the predetermined set even if the predetermined value is provided in the predetermined set. Accordingly, according to the embodiment of the present invention, when the Bloom filter determines "negative", it is not necessary to verify that the prefix matching the inputted prefix is provided by accessing the hash table, such that it is possible to improve search efficiency by reducing the number of times in which a memory is accessed the hash table.

The processor 340 includes the hash table and an overflow table. When the Bloom filter 330 determines "positive", the processor 340 determines whether matched entries are provided by comparing the inputted prefix with entries stored in locations of the hash table, which are indicated by the hashing indexes by using the plurality of hashing indexes generated from the hashing index generator 324 as the pointer. In this case, when the matched entries are provided, the entries are outputted. Further, the processor 340 outputs matched entries by comparing the inputted prefix with entries stored in the overflow table.

In addition, the processor 340 outputs an entry having the longest number of bits that matches the inputted prefix among the outputted entries as a best matching prefix (BMP).

Further, when the entries stored in the location indicated by the hashing index or the entries stored in the overflow table do not match the inputted prefix or the Bloom filter 330 determines "negative", the processor 340 transmits a control signal to the buffering means 310 to allow the buffering means 310 to output a prefix that is smaller than the inputted prefix by one bit to the CRC generator 322 again.

At this time, the processor 340 determines whether or not a prefix having the same length as the prefix to be outputted from the buffering means is provided in the hash table before the prefix is outputted from the buffering means 310 to the CRC generator 322. In this case, when the prefix having the same length is not provided, the processor 340 may be implemented so that the prefix having the number of bits reduced by one bit is outputted from the buffering means 310 by outputting the control signal. The reason for this is that it is not necessary to search whether or not a prefix that matches the outputted prefix is provided when the prefix having the same length as the prefix outputted from the buffering means is not provided in the table. By this configuration, it is possible to improve a search speed.

In the embodiment, the hash table is implemented as many as the number of hashing indexes. By this configuration, it is possible to reduce the size of the memory and facilitate configuration of the hash table in comparison with known methods in which the hash table is implemented for each prefix length. Further, by storing each hash table in a separate SRAM, when the processor accesses the hash table, the processor can access the hash table in parallel.

The capacity of the memory for implementing the hash table depends on the number of hash tables, the number of buckets (a row of the hash table) per the hash table, and the number of loads (a column of the hash table) per the bucket. It is possible to adjust the number of prefixes stored in the overflow table to a predetermined number or less by appropriately adjusting the capacity of the memory. Accordingly, the overflow table may be implemented by a cache memory or a ternary content addressable memory (TCAM).

In the embodiment of the present invention described above, by commonly using the plurality of hashing indexes generated from the hashing hardware as the pointers of the Bloom filter and the hash table, it is possible to reduce the number of hashings to facilitate implementation. That is, the hashing index is commonly used by implementing the Bloom filter having the same size as the hash table (the number of buckets per the hash table) to be the same. For example, when the size of the Bloom filter and the size of the hash table are 8 bits, a 3-bit hashing index may be used.

However, the present invention is not limited thereto and the hashing index for the pointer of the Bloom filter and the hashing index for the pointer of the hash table may be implemented to be separately generated. In particular, in the case in which the size of the Bloom filter and the size of the hash table are implemented to be different, different hashing indexes are generated depending on the size of each of the Bloom filter and hash table.

FIG. 5 is a diagram illustrating a configuration of an IP address lookup apparatus according to another embodiment of the present invention.

In another embodiment of the present invention, the size of the Bloom filter and the size of the hash table are different. A hashing hardware 520 generates a plurality of first hashing indexes for a pointer of a Bloom filter 530 and a plurality of second hashing indexes for a pointer for a hash table 540 from an inputted prefix and outputs the first and second hashing indexes to the Bloom filter 530 and a processor 540. For example, when the size of the Bloom filter 530 is 16 and the size of the hash table is 8, the first hashing index is 4 bits and the second hashing index is 3 bits.

In FIG. 6, the hashing hardware is implemented by using a CRC generator. When the CRC generator 522 generates scrambled codes having a predetermined length from the inputted prefix, a hashing index generator 524 extracts the plurality of first hashing indexes and the plurality of second hashing indexes from the codes. For example, in the case in which the size of the Bloom filter 530 is 16, the size of the hash table is 8, and the number of first hashing indexes and the number of second hashing indexes are two, the hashing index generator extracts the first 4 bits and the last 4 bits of the code to generate two first hashing indexes and extracts the first 3 bits and the last 3 bits of the code to extract two second hashing indexes.

The Bloom filter 530 determines whether or not values of all bit vectors are 1 by using the plurality of first hashing indexes outputted from the hashing hardware 520 to determine whether or not the inputted prefix is a member of the hash table.

As a result of the Bloom filter's determination, in the case in which the inputted prefix is the member of the hash table, the processor 540 determines whether or not a prefix matching the inputted prefix among entries of locations indicated by the plurality of second hashing indexes is provided in the hash table.

Other constituent members are the same as those described in FIG. 3 thus, the description thereof will be omitted.

According to another embodiment of the present invention, in particular, when the size of the Bloom filter increases, it is possible to decrease the number of times in which the hash table is accessed by reducing "false positive". The description thereof will be made below.

FIG. 7 illustrates an entry architecture of the hash table used in the embodiment of the present invention. The total size of the entries stored in the hash table is 46 bits. The entry architecture is constituted by a valid field (1 bit) showing that the prefix is stored in the entry, a prefix field (32 bits) in which the prefix is stored, a length field (5 bits) showing the length of the stored prefix, and an output port field (8 bits) showing an output port of the prefix.

According to the configuration of the present invention described above, the Bloom filter may be easily implemented by a single Bloom filter without implementing the Bloom filter for each prefix length in the architecture using the known Bloom filter described in FIG. 2. Further, since it is not necessary to implement the hash table for each prefix length, it is possible to reduce the capacity of the memory and easily implement the hash table.

Hereinafter, in the IP address lookup apparatus of the present invention described above, a method of programming the Bloom filter and storing the prefix in the hash table, and a process of searching an IP address will be described.

For better understanding and ease of description, a case in which the size of the Bloom filter and the size of the hash table are the same will be described as an example. When the size of the Bloom filter and the size of the hash table are different, the hashing index used as the pointer for the Bloom filter and the hashing index used as the pointer for the hash table are just different from each other, but their principles are the same.

Further, when the number of prefixes is represented by N, the size of the Bloom filter is represented by M, and the number of hashing indexes is represented by k, N=7, K=2, and M=N'=$2^{\lceil log_2 N \rceil}$. A case using an 8-bit CRC generator will be described as one example ($\lceil \chi \rceil$: the smallest integer larger than x).

In this case, the size of the Bloom filter is M=N'=8 and the size of the hash table also is 8. Further, the size of the hashing index is $\lceil log_2 N \rceil$=3 bits.

Table 1 illustrates 8-bit CRC codes for 7 prefixes.

TABLE 1

| Prefix | CRC Code |
| --- | --- |
| 001* | 10101011 |
| 0010* | 11010101 |
| 101* | 01000001 |
| 11111* | 01011011 |
| 111110* | 10101101 |
| 10001111* | 10110110 |
| 11100010* | 01110001 |

In Table 2, two hashing indexes for the pointers of the Bloom filter and the hash table are generated by extracting first 3 bits and last 3 bits from the codes generated from the CRC generator.

TABLE 2

| CRC Code | Hashing Index 1 | Hashing Index 2 |
| --- | --- | --- |
| 10101011 | 101 (5) | 011 (3) |
| 11010101 | 110 (6) | 101 (5) |
| 01000001 | 010 (2) | 001 (1) |
| 01011011 | 010 (2) | 011 (3) |
| 10101101 | 101 (5) | 101 (5) |
| 10110110 | 101 (5) | 110 (6) |
| 01110001 | 011 (3) | 001 (1) |

The Bloom filter is programmed by using the hashing index. This will be described with reference to FIGS. 8A and 8B.

FIGS. 8A and 8B are diagrams for illustrating a method of programming a Bloom filter according to an embodiment of the present invention.

As shown in FIG. 8A, when a prefix 001* is inputted, a CRC code of 10101011 is generated (see Table 1), thus, hashing indexes of 101 and 011 are generated.

101 which is the hashing index corresponds to 5 as a decimal number and 011 corresponds to 3 as the decimal number, values of the 5th and 3rd bit vectors are set to 1 in the Bloom filter.

FIG. 8B illustrates a result of programming all prefixes of Table 1 in the Bloom filter by such a scheme.

When a predetermined hashing index is inputted into the programmed Bloom filter, the Bloom filter determines whether a value of a bit vector corresponding to the hashing index is 1 to determine that the inputted value is the member of the hash table.

FIG. 9 is a diagram for illustrating a method of storing a prefix in a hash table according to an embodiment of the present invention.

For example, when the prefix of 001* is inputted, the hashing indexes corresponding thereto are 101 and 011 to access a 5th bucket of a first hash table and a 3rd bucket of a second hash table. At this time, by comparing the numbers of loads stored in the two accessed buckets, the prefix of 001* is inputted into any one of the buckets, which has the smaller number of loads.

If both the two buckets are full of the prefixes, the prefix is stored in the overflow table.

By such a prefix, each prefix is stored in the hash table. FIG. 10 illustrates a result of storing all prefixes of Table 1 in the hash table by such a scheme and description thereof will be made below.

Hereinafter, updating the prefix will be described. First, in the case of adding the prefix, the prefix to be added is inputted into the hashing hardware, such that the hashing index is generated and the Bloom filter is programmed by using the generated hashing index. Next, when a location indicated by the hashing index is vacant in the hash table, the prefix is added to the location and when all locations indicated by the hash table are full, the prefix is stored in the overflow table.

In the case of deleting the prefix, after a hashing index corresponding to a prefix to be deleted is obtained, when a matched prefix is discovered at a location indicated by the hashing index, the prefix is deleted. At this time, the Bloom filter does not program the bit vector corresponding to the hashing index to 0 again. Since the value of the bit vector of the Bloom filter may be programmed by not one input but several inputs, filtering other inputs may be mistaken in the case in which the bit vector corresponding to the prefix to be deleted is set to 0. In this case, "false positive" may increase, but the increased "false positive" has no influence on the accuracy in searching the BMP in the hash table. A "counting Bloom filter" that stores the number of prefixes corresponding to the bit vectors of the Bloom filter in the bit vectors of the Bloom filter may be used so as not to increase "false positive". In the case of using the "counting Bloom filter", a count value of the corresponding bit vector is reduced by 1 whenever the prefix is deleted and when the count value is 0, the corresponding bit value of the Bloom filter is set to 0.

Hereinafter, the process of searching the IP address according to the embodiment of the present invention will be described.

First, when the prefix is inputted, the plurality of hashing indexes are generated by hashing the inputted prefix and querying is performed with respect to the Bloom filter through the generated hashing index. When 0 is provided among the values of the bit vectors corresponding to the plurality of hashing indexes, a prefix that matches the inputted prefix is not provided in the hash table. Accordingly, the processor performs a control to reinput a prefix reduced from the presently inputted prefix by 1 bit without searching the hash table.

If values of all bit vectors corresponding to the plurality of hashing indexes are 1, the prefix that matches the inputted prefix may be provided, the processor searches the entries of the locations indicated by the plurality of hashing indexes in the hash table and verifies whether or not the prefix that matches the inputted prefix is provided. At this time, in the case in which the hash tables as many as the number of hashing indexes are implemented in a separate SRAM, it is possible to search the hash tables at the same time by accessing the hash tables in parallel.

As a result of searching the hash table, when the prefix matching the inputted prefix is provided, the prefix is the matched prefix having the most length, such that the prefix is outputted as a result value. In this case, the prefixes stored in the overflow table are also searched and when the prefix matching the inputted prefix is provided, the prefix having the longer number of matched bits is outputted as the result value by comparing the matched prefix stored in the overflow table with the result outputted from the hash table.

If the matched prefix is not provided, the prefix reduced from the inputted prefix by 1 bit is reinputted and the above-mentioned process is repeated.

FIG. 10 is an exemplary diagram for illustrating a process of searching an IP address according to an embodiment of the present invention.

For better understanding and ease of description, FIG. 10 illustrates a result of programming 7 prefixes of Table 1 in the Bloom filter and storing 7 prefixes in the hash table.

First, assuming that the inputted prefix is 11111001, the 8-bit CRC code for the prefix is 11000000 and the hashing indexes are 110 (6) and 000 (0). Therefore, a value of a $6^{th}$ bit vector and a value of a $0^{th}$ bit vector of the Bloom filter are verified. In this case, since the value of the $0^{th}$ bit vector is 0, the prefix is not the member of the hash table, and thus the hash table is not accessed.

Accordingly, searching must be performed with respect to 1111100 by reducing the inputted prefix by 1 bit again. However, since the prefix having the length of 7 bits is not provided in a stored prefix set, it is not necessary to search the prefix having the length of 7 bits. Accordingly, searching must be performed with respect to 111110 by reducing the inputted prefix by 1 bit again.

The 8-bit CRC code for the prefix of 111110 is 10101101 and both hashing indexes are 101 (5). Since a value of a $5^{th}$ bit vector of the Bloom filter is 1, this input value passes through the Bloom filter and since a matched prefix of 111110* is provided in a $5^{th}$ bucket of hash table 2, 111110* is outputted as a result value. That is, a prefix having the longest length, which matches a prefix of 11111001 is determined as 111110*, thus, searching is terminated.

In the process of searching the IP address described above, the hashing index for the Bloom filter and the hashing index or the hash table are the same, but the process is not limited thereto and when the size of the Bloom filter and the size of the hash table are different from each other, another hashing index may be used.

<Performance Evaluation of Invention>

Performance is tested by using routing tables having various sizes, which are actually used in a back-bone router. Prefixes actually provided in the routing tables have a maximum length of 32 bits, such that a 32-bit CRC is used for the simulation.

Table 3 illustrates the number of overflows in the routing tables used in the test. The table size represents the number of entries of a multi-hash table. In Table 3, the number of overflows and a memory usage when the number of entries of the multi-hash table is set to $2^{\lfloor \log_2 N \rfloor}$ ($\lfloor \chi \rfloor$: the largest integer among integers smaller than x) and the number of overflows and a memory usage when the number of entries of the multi-hash table is set to $2^{\lceil \log_2 N \rceil}$ are compared with each other with respect to the number N of prefixes. The memory usage in the present invention has a trade-off relationship with the number of overflows. The number of overflows can be controlled by using a memory having a proper size. For example, when $2^{\lceil \log_2 N \rceil}$ is used as the number of entries of the table, no overflow occurs except for only one overflow that occurs in PORT80.

TABLE 3

|  | N | N' | Table Size | No. of overflow | Memory Usage (Mbyte) |
|---|---|---|---|---|---|
| MAE | 14553 | 8192 | $2^{13}$ | 35 | 0.18 MB + 35 entry TCAM |
|  |  | 16384 | $2^{14}$ | 0 | 0.36 MB |
| Aads | 20204 | 16384 | $2^{14}$ | 1 | 0.36 MB + 1 entry TCAM |
|  |  | 32768 | $2^{15}$ | 0 | 0.72 MB |
| MAE-WEST2 | 29584 | 16384 | $2^{14}$ | 0 | 0.36 MB |
|  |  | 32768 | $2^{15}$ | 0 | 0.72 MB |
| MAE-EAST1 | 37993 | 32768 | $2^{15}$ | 1 | 0.72 MB + 1 entry TCAM |
|  |  | 65536 | $2^{16}$ | 0 | 1.44 MB |
| MAE-EAST2 | 39464 | 32768 | $2^{15}$ | 2 | 0.72 MB + 2 entry TCAM |
|  |  | 65536 | $2^{16}$ | 0 | 1.44 MB |
| PORT80 | 112310 | 65536 | $2^{16}$ | 176 | 1.44 MB + 176 entry TCAM |

TABLE 3-continued

|  | N | N' | Table Size | No. of overflow | Memory Usage (Mbyte) |
|---|---|---|---|---|---|
|  |  | 131072 | $2^{17}$ | 1 | 2.88 MB + 1 entry TCAM |
| Grouptlcom | 170601 | 131072 | $2^{17}$ | 32 | 2.88 MB + 32 entry TCAM |
|  |  | 262144 | $2^{18}$ | 0 | 5.75 MB |
| Telstra | 227223 | 131072 | $2^{17}$ | 48 | 2.88 MB + 48 entry TCAM |
|  |  | 262144 | $2^{18}$ | 0 | 5.75 MB |

(Memory Usage)

Table 4 and FIG. 11 illustrate the performance of a Bloom filter architecture according to the present invention. The performance when the number of entries of the multi-hash table is determined as $N'=2^{\lceil log_2 N \rceil}$ is prepared and the simulation is performed while increasing the size of a Bloom filter M to N', 2N', 4N', 8N', and 16N'. Herein, $BT_{max}$, as the maximum number of probes (accesses) of the Bloom filter, is equal to the number of prefixes having different lengths that are provided in the routing table and $BT_{avg}$ is the average number of probes of the Bloom filter. Since querying the Bloom filter stops when a matched prefix having the longest length is found, $BT_{avg}$ is generally smaller than $BT_{max}$. $HT_{max}$ is the maximum number of probes of the hash table, $HT_{avg}$ is the average number of probes of the hash table, and a hash table access rate is a rate of a probe of the hash table to a probe of the Bloom filter when querying the Bloom filter.

As shown in Table 4, the hash table access rate rapidly decreases while the size M of the Bloom filter increase from N' to 16N'. As the size of the Bloom filter increases, "false positive" remarkably decreases. Therefore, a filtering ability of the Bloom filter is improved to prevent a memory from unnecessarily accessing the hash table. This means that a rate of "negative" in the Bloom filter increases while "false positive" decreases. Further, this means that as the size of the Bloom filter increases, the filtering ability of the Bloom filter is improved. When the size of the Bloom filter is 16N', it is possible to search an IP address by accessing the hash table averagely at one time.

TABLE 4

| Routing Table | | | no. of normalized Bloom filter probes | | | no. of normalized multi-hashing table probes | | hash table access rate |
|---|---|---|---|---|---|---|---|---|
| (N) | N' | M | $BT_{max}$ | $BT_{avg}$ | Size | $HT_{max}$ | $HT_{avg}$ | (%) |
| MAE-WES T1 (14553) | 16384 | N' | 22 | 8.16 | $2^{14}$ | 19 | 5.97 | 73.2 |
|  |  | 2N' |  |  |  | 15 | 3.49 | 42.8 |
|  |  | 4N' |  |  |  | 12 | 1.98 | 24.3 |
|  |  | 8N' |  |  |  | 9 | 1.29 | 15.8 |
|  |  | 16N' |  |  |  | 6 | 1.09 | 13.4 |
| Aads (20204) | 32768 | N' | 20 | 5.88 | $2^{15}$ | 14 | 3.49 | 59.4 |
|  |  | 2N' |  |  |  | 11 | 2.06 | 35.0 |
|  |  | 4N' |  |  |  | 7 | 1.35 | 23.0 |
|  |  | 8N' |  |  |  | 4 | 1.11 | 18.9 |
|  |  | 16N' |  |  |  | 4 | 1.04 | 17.7 |
| MAE-WES T2 (29584) | 32768 | N' | 24 | 9.98 | $2^{15}$ | 22 | 7.33 | 73.4 |
|  |  | 2N' |  |  |  | 18 | 4.22 | 42.3 |
|  |  | 4N' |  |  |  | 9 | 2.19 | 21.9 |
|  |  | 8N' |  |  |  | 7 | 1.37 | 13.7 |
|  |  | 16N' |  |  |  | 6 | 1.11 | 11.1 |
| MAE-EAST1 (37993) | 65536 | N' | 22 | 7.99 | $2^{18}$ | 19 | 4.39 | 54.9 |
|  |  | 2N' |  |  |  | 15 | 2.38 | 29.8 |
|  |  | 4N' |  |  |  | 9 | 1.47 | 18.4 |
|  |  | 8N' |  |  |  | 7 | 1.15 | 14.4 |
|  |  | 16N' |  |  |  | 6 | 1.06 | 13.3 |
| MAE-EAST2 (39464) | 65536 | N' | 22 | 7.88 | $2^{18}$ | 18 | 4.45 | 56.5 |
|  |  | 2N' |  |  |  | 14 | 2.43 | 30.8 |
|  |  | 4N' |  |  |  | 8 | 1.49 | 18.9 |
|  |  | 8N' |  |  |  | 8 | 1.16 | 14.7 |
|  |  | 16N' |  |  |  | 7 | 1.06 | 13.5 |
| PORT80 (112310) | 131072 | N' | 25 | 11.96 | $2^{17}$ | 24 | 8.35 | 69.8 |
|  |  | 2N' |  |  |  | 20 | 4.69 | 39.2 |
|  |  | 4N' |  |  |  | 20 | 2.40 | 20.1 |
|  |  | 8N' |  |  |  | 16 | 1.48 | 12.4 |
|  |  | 16N' |  |  |  | 15 | 1.17 | 9.8 |
| Grouptlcom (170601) | 262144 | N' | 20 | 6.77 | $2^{18}$ | 18 | 4.07 | 60.1 |
|  |  | 2N' |  |  |  | 16 | 2.33 | 34.4 |
|  |  | 4N' |  |  |  | 15 | 1.47 | 21.7 |
|  |  | 8N' |  |  |  | 15 | 1.16 | 17.1 |
|  |  | 16N' |  |  |  | 13 | 1.07 | 15.8 |
| Telstra (227223) | 262144 | N' | 25 | 9.43 | $2^{18}$ | 24 | 6.75 | 71.6 |
|  |  | 2N' |  |  |  | 21 | 3.91 | 41.5 |
|  |  | 4N' |  |  |  | 17 | 2.11 | 22.4 |
|  |  | 8N' |  |  |  | 18 | 1.38 | 14.6 |
|  |  | 16N' |  |  |  | 16 | 1.14 | 12.1 |

FIG. 12 is a graph comparing memory demands of a hash table when a size of a Bloom filter increases. As known from this result, the size of the Bloom filter has no influence on the total memory demand.

FIG. 13 is a graph comparing the average number of times in which a memory is accessed of an IP lookup architecture according to the present invention with that of a known IP lookup architecture. FIG. 14 is a graph comparing the maximum number of times in which a memory is accessed of an IP lookup architecture according to the present invention with that of a known IP lookup architecture. In FIGS. 13 and 14, a P-trie represents a priority trie and a BSL as binary search on length is an architecture that performs a binary search depending on a length. Further, a BST as binary search tree is an architecture that performs the binary search and a WBST as weighted binary search tree is an architecture considering a weighted value of each prefix when configuring a binary search tree.

In the architecture of the present invention used for performance comparison, the size of the Bloom filter is M=16N' and the size of the hash table is N'. Further, in this architecture, no overflow occurs except for one overflow that occurs in the PORT80 routing table. Further, since the Bloom filter consumes very small memory capacity in order to store the memory in a cache memory, the access to the memory is not included in the number of times in which a memory is accessed.

As shown in FIG. 13, the architecture (represented by Prop) according to the present invention has the number of times in which the memory is accessed 2 to 10 times smaller than other architectures.

Further, as shown in FIG. 14, the architecture according to the present invention shows the most excellent performance except for a BSL algorithm. However, it is assumed that the BSL architecture, as an architecture that performs the binary search for the prefix length, can find a perfect hashing function when configuring a hash table for each prefix length. In the BSL, without assuming the perfect hashing function, in the case of assuming a linear search for collided prefixes by allowing collision of the prefixes, it is expected that the performance of the BSL will be deteriorated.

According to the embodiment of the present invention described above, since the IP address lookup architecture of the present invention can be implemented by using only one Bloom filter and a hash table needs not to be configured for each prefix length, it is possible to easily implement the IP address lookup architecture of the present invention and reduce the number of memories at the time of implementing the IP address lookup architecture. Further, as described in the performance evaluation, the IP address lookup architecture of the present invention shows that the number of times in which a memory is accessed is reduced and searching ability is faster in comparison with the known IP address lookup architecture.

The spirit of the present invention has been just exemplified. It will be appreciated by those skilled in the art that various modifications, changes, and substitutions can be made without departing from the essential characteristics of the present invention. Accordingly, the embodiments disclosed in the present invention and the accompanying drawings are used not to limit but to describe the spirit of the present invention. The scope of the present invention is not limited only to the embodiments and the accompanying drawings. The protection scope of the present invention must be analyzed by the appended claims and it should be analyzed that all spirits within a scope equivalent thereto are included in the appended claims of the present invention.

What is claimed is:

1. An IP (Internet Protocol) address lookup apparatus using a Bloom filter and a multi-hashing architecture, comprising:
    a buffering means that outputs a prefix of an inputted address having the number of bits reduced by one bit whenever a control signal is received at the time of outputting the prefix of the inputted address;
    a hashing hardware that generates a plurality of hashing indexes by hashing the prefix (hereinafter, referred to as "output prefix") outputted from the buffering means;
    a Bloom filter that determines whether or not the output prefix is an entry of the hash table by using the plurality of hashing indexes; and
    a processor that includes the hash table and an overflow table and outputs a prefix that matches the output prefix by searching entries of locations of the hash table indicated by the plurality of hashing indexes and entries stored in the overflow table when a Bloom filter's determination result is positive and outputs the control signal to the buffering means when the matched prefix is not provided or the Bloom filter's determination result is negative.

2. The IP address lookup apparatus using a Bloom filter and a multi-hashing architecture according to claim 1, wherein the hashing hardware includes:
    a CRC generator that generates codes having a constant length from the output prefix outputted from the buffering means; and
    a hashing index generator that generates the plurality of hashing indexes from the codes.

3. An IP (Internet Protocol) address lookup apparatus using a Bloom filter and a multi-hashing architecture, comprising:
    a buffering means that outputs a prefix of an inputted address having the number of bits reduced by one bit whenever a control signal is received at the time of outputting the prefix of the inputted address;
    a hashing hardware that generates a plurality of first hashing indexes and a plurality of second hashing indexes by hashing the prefix (hereinafter, referred to as "output prefix") outputted from the buffering means;
    a Bloom filter that determines whether or not the output prefix is an entry of the hash table by using the plurality of first hashing indexes; and
    a processor that includes the hash table and an overflow table and outputs a prefix that matches the output prefix by searching entries of locations of the hash table indicated by the plurality of second hashing indexes and entries stored in the overflow table when a Bloom filter's determination result is positive and outputs the control signal to the buffering means when the matched prefix is not provided or the Bloom filter's determination result is negative.

4. The IP address lookup apparatus using a Bloom filter and a multi-hashing architecture according to claim 3, wherein the hashing hardware includes:
    a CRC generator that generates codes having a constant length from the output prefix outputted from the buffering means; and
    a hashing index generator that generates the plurality of first hashing indexes and the plurality of second hashing indexes from the codes.

5. The IP address lookup apparatus using a Bloom filter and a multi-hashing architecture according to claim 1 or 3, wherein the processor determines whether or not a prefix having the same length as the output prefix is provided in the hash table and outputs the control signal to output a prefix having the number of bits reduced from the output prefix by one bit to the hashing hardware when the prefix is not provided in the hash table, before the output prefix is outputted to the hashing hardware.

6. The IP address lookup apparatus using a Bloom filter and a multi-hashing architecture according to claim 1 or 3, wherein the number of the hash tables is equal to the number of the plurality of hashing indexes.

7. The IP address lookup apparatus using a Bloom filter and a multi-hashing architecture according to claim 6, wherein the hash tables are implemented by separate SRAMs, respectively.

8. The IP address lookup apparatus using a Bloom filter and a multi-hashing architecture according to claim 1 or 3, wherein the overflow table is implemented by a cache memory or a ternary content addressable memory (TCAM).

9. An IP address lookup method using a Bloom filter and a multi-hashing architecture, comprising:
   (a) generating a plurality of hashing indexes by hashing inputted prefixes;
   (b) determining whether a bit vector corresponding to the plurality of hashing indexes is positive or negative by using the Bloom filter;
   (c) outputting a prefix matching the inputted prefix by searching entries of locations indicated by the plurality of hashing indexes in the hash table when the bit vector is determined to be positive in step (b);
   (d) outputting the prefix that matches the inputted prefix by searching entries stored in the overflow table;
   (e) outputting as a result value a matched prefix having the longest length among the prefix outputted in step (c) and the prefix outputted in step (d), which matches the prefix; and
   (f) reinputting a prefix having the number of bits reduced from the inputted prefix by one bit and returning to step (a) when the bit vector is determined to be negative in step (b) or an entry matching the prefix is not provided in steps (c) and (d).

10. The IP address lookup method using a Bloom filter and a multi-hashing architecture according to claim 9, wherein step (a) includes:
    (a1) generating codes having a constant length from the inputted prefixes by using a CRC generator; and
    (a2) generating the plurality of hashing indexes from the codes.

11. The IP address lookup method using a Bloom filter and a multi-hashing architecture according to claim 9, wherein the number of the hash tables is equal to the number of the plurality of hashing indexes.

12. The IP address lookup method using a Bloom filter and a multi-hashing architecture according to claim 11, wherein in step (c), searching is performed by accessing the hash tables in parallel by using the plurality of hashing indexes.

13. An IP address lookup method using a Bloom filter and a multi-hashing architecture, comprising:
    (a) generating a plurality of first hashing indexes and a plurality of second hashing indexes by hashing inputted prefixes;
    (b) determining whether a bit vector corresponding to the plurality of first hashing indexes is positive or negative by using the Bloom filter;
    (c) outputting a prefix that matches the inputted prefix by searching entries of locations indicated by the plurality of second hashing indexes in the hash table when the bit vector is determined to be positive in step (b);
    (d) outputting the prefix that matches the inputted prefix by searching entries stored in the overflow table;
    (e) outputting as a result value a matched prefix having the longest length among the prefix outputted in step (c) and the prefix outputted in step (d), which matches the prefix; and
    (f) reinputting a prefix having the number of bits reduced from the inputted prefix by one bit and returning to step (a) when the bit vector is determined to be negative in step (b) or an entry matching the prefix is not provided in steps (c) and (d).

14. The IP address lookup method using a Bloom filter and a multi-hashing architecture according to claim 13, wherein step (a) includes:
    (a1) generating codes having a constant length from the inputted prefixes by using a CRC generator; and
    (a2) generating the plurality of first hashing indexes and the plurality of second hashing indexes from the codes.

15. The IP address lookup method using a Bloom filter and a multi-hashing architecture according to claim 13, wherein the number of the hash tables is equal to the number of the plurality of second hashing indexes.

16. The IP address lookup method using a Bloom filter and a multi-hashing architecture according to claim 15, wherein in step (c), searching is performed by accessing the hash tables in parallel by using the plurality of second hashing indexes.

17. The IP address lookup method according to claim 9 or 13, wherein step (f) includes:
    (f1) reducing the number of bits of the inputted prefix by one bit when the bit vector is determined to be negative in step (b) or an entry matching the prefix is not provided in steps (c) and (d);
    (f2) determining whether or not the same length as the length of the inputted prefix having the number of bits reduced by one bit is provided in the hash table;
    (f3) inputting the inputted prefix having the number of bits reduced by one bit and returning to step (a) when the length is provided in the hash table; and
    (f4) reducing the number of bits of the inputted prefix, which is reduced by one bit, by further one bit and returning to step (f2) when the length is not provided in the hash table.

* * * * *